(12) United States Patent
Hu

(10) Patent No.: US 6,880,810 B1
(45) Date of Patent: Apr. 19, 2005

(54) BELT REEL ASSEMBLY FOR FASTENING GOODS ON A TRUCK

(75) Inventor: Yu Fang Hu, Taichung (TW)

(73) Assignee: Ratchet Co., Ltd., Taichung Hsien (TW)

( * ) Notice: Subject to any disclaimer, the term of this patent is extended or adjusted under 35 U.S.C. 154(b) by 0 days.

(21) Appl. No.: 10/684,193

(22) Filed: Oct. 14, 2003

(51) Int. Cl.[7] ............................................. B25B 25/00
(52) U.S. Cl. ..................... 254/218; 254/223; 24/70 ST; 24/69 ST
(58) Field of Search ............................. 254/217, 218, 254/223; 24/70 R, 70 ST, 69 ST, 69 CT

(56) References Cited

U.S. PATENT DOCUMENTS 2,270,271 A * 1/1942 Coffing ........................ 254/223
4,154,427 A * 5/1979 Hofmann ................... 24/68 CD
5,271,606 A * 12/1993 Kamper ....................... 254/217

FOREIGN PATENT DOCUMENTS

EP    0504557 A1 *    1/1992

\* cited by examiner

Primary Examiner—Emmanuel Marcelo
(74) Attorney, Agent, or Firm—Rosenberg, Klein & Lee

(57) ABSTRACT

A belt reel for fastening goods on a truck includes an axle extending through a main frame and a lever to pivotally mount the main frame and the lever to each other. The axle includes two opposite ends each having a ratchet wheel mounted thereto between the main frame and the lever and rotated with the axle. A slot is diametrically defined in the axle for allowing a belt extending through the axle. The main frame has a stop plate slidably mounted therein and selectively engaged to the ratchet, and the lever has a pawl slidably mounted therein. The pawl is engaged to the ratchet for driving the axle to reel the belt and separated from the ratchet for releasing the strain of the strained belt.

10 Claims, 16 Drawing Sheets

BELT REEL ASSEMBLY FOR FASTENING GOODS ON A TRUCK

BACKGROUND OF THE INVENTION

1. Field of the Invention

The present invention relates to a belt reel, and more particularly to a belt reel for fastening goods on a truck. The belt reel can certainly release the strain of the belt step by step.

2. Description of Related Art

A conventional belt reel assembly for fastening goods on a truck in accordance with the prior art shown in FIGS. 13–16 comprises main frame (81), a lever (82) and an axle (83) laterally extending through the main frame (81) and the lever (82) for pivotally mounting the main frame (81) an the lever (82) to each other. Two ratchets (84) are respectively mounted to two opposite ends of the axle (83) and rotated with the axle (83). The lever (82) includes a pawl (821) slidably mounted therein. The main frame (81) has an indentation (811) defined therein and corresponds to the pawl (821), and a concave portion (812) defined adjacent to the indentation (811). A stopper (813) extends from the main frame (81) between the indentation (811) and the concave portion (812). The main frame (81) has a stop plate (814) slidably mounted in the main frame (81) and engaged to the two ratchets (84). The lever (82) has a convex (822) extending therefrom and corresponding to the stop plate (814). The convex portion (822) of the lever (82) backward pushes and makes the stop plate (814) be disengaged to the ratchet (84) when the pawl (821) is moved within the indentation (811). Then the axle (83) and the ratchets (84) are in a free condition so that the belt (85) is released due to the strain of the strained belt (85). The tooth of the ratchet (84) is moved over the pawl (821) and the stop plate (814) engaged to the ratchet (84) again when the pawl (821) is move to the guiding side (815) of the indentation (811) and the convex portion (822) of the lever (82) is separated from the stop plate (814). Consequently, the ratchet (84) is only rotated about one pitch of the teeth of the ratchet (84) when releasing the strain of the strained belt (85) step by step.

However, the strained belt (85) usually contains a great strain and the stop plate (814) is securely engaged to the ratchet (84) so that the operator needs to laboriously pull the lever (82) to make the convex (822) thereof backward push the stop plate (814). The great strain of the strained belt (5) speedily rotates the ratchet (84) and drives the pawl (821) moved to the guiding side (815). The operator hardly stops exerting force because the pawl (821) is moved to the guiding side (815) in moment. In fact, the operator usually continually exerts force to pull the lever (82) so that the convex portion (822) may backward push the stop plate (814) again. Consequently, the ratchet (84) is rotated more than one pitch thereof and the strain of the strained belt (85) may not be released step by step.

The pawl (821) is moved to be partially received in the second indentation (816), and the axle (83) and ratchet (84) is in a free condition after the strain of the strained belt (85) being fully released and then the operator can easily pull the belt (85) from the conventional belt reel. However, the operator needs to continually pull the pawl (821) when moving the pawl (821) toward the second indentation (816). It is a laborious design and inconvenient operated.

The present invention has arisen to mitigate and/or obviate the disadvantages of the conventional belt reel for fastening goods on a truck.

SUMMARY OF THE INVENTION

The main objective of the present invention is to provide an improved belt reel for fastening goods on a truck. The belt reel of the present invention can certainly release the strain of the belt step by step.

To achieve the objective, the belt reel in accordance with the present invention comprises an axle extending through a main frame and a lever to pivotally mount the main frame and the lever to each other. The axle includes two opposite ends each having a ratchet wheel mounted thereto between the main frame and the lever and rotated with the axle. Each ratchet wheel has a series of teeth radially extending therefrom and a slot is diametrically defined in the axle for allowing a belt extending through the axle. The main frame includes a stop plate slidably mounted therein and a spring compressively mounted between the main frame and the stop plate so that the stop plate is engaged to the two ratchet wheels due to a restitution force of the spring. The lever includes a pawl slidably mounted therein and a resilient member is mounted between the lever and the pawl so that the pawl is selective engaged to the two ratchet wheels due to a restitution force of the resilient member. The lever includes a pivot portion having two opposite sides each having a convex portion extending from the lever and corresponding to the two opposite sides of the stop plate. The main frame includes a pivot end having two opposite sides each sequentially having a concave portion defined in the main frame, a stopper extending from the main frame, a groove defined in the main frame, an indentation defined in the main frame and a connecting portion formed between the groove and the indentation. The groove includes a first side formed adjacent to the stopper and a second side formed adjacent to the connecting portion. The convex portion backward pushes the stop plate to make the stop plate disengaged from the ratchet wheels when the pawl abuts the second side of the groove. The convex portion backward pushes the stop plate to make the stop plate disengaged from the ratchet wheels and the pawl is disengaged from the ratchet wheels when the pawl is partially received in the indentation. Two plates are respectively pivotally mounted to two opposite sides of the main frame. Each plate has a cam portion extending therefrom to the groove. The cam portion is tapered and has a first guide side and a second guide side. The cam portion makes the pawl moved over the series of teeth of each of the ratchet wheels. Each plate is positioned when the pawl is moved over the cam portion. The pawl is moved along the first guide side when the pawl is moved within the groove toward the second side of the groove. The pawl is firstly clamped between one tooth of the each of the ratchet wheels and the cam portion and secondarily moved over the cam portion along the second guide side when the pawl is moved within the groove toward the first side of the groove due to a reverse ratchet. A protrusion extends from each of the connecting portion toward the stopper. The protrusion extends through the pawl when the pawl is moved toward the second side of the groove and abuts the protrusion that guides the pawl to the indentation.

Further benefits and advantages of the present invention will become apparent after a careful reading of the detailed description with appropriate reference to the accompanying drawings.

DETAILED DESCRIPTION OF THE INVENTION

Figure 1:
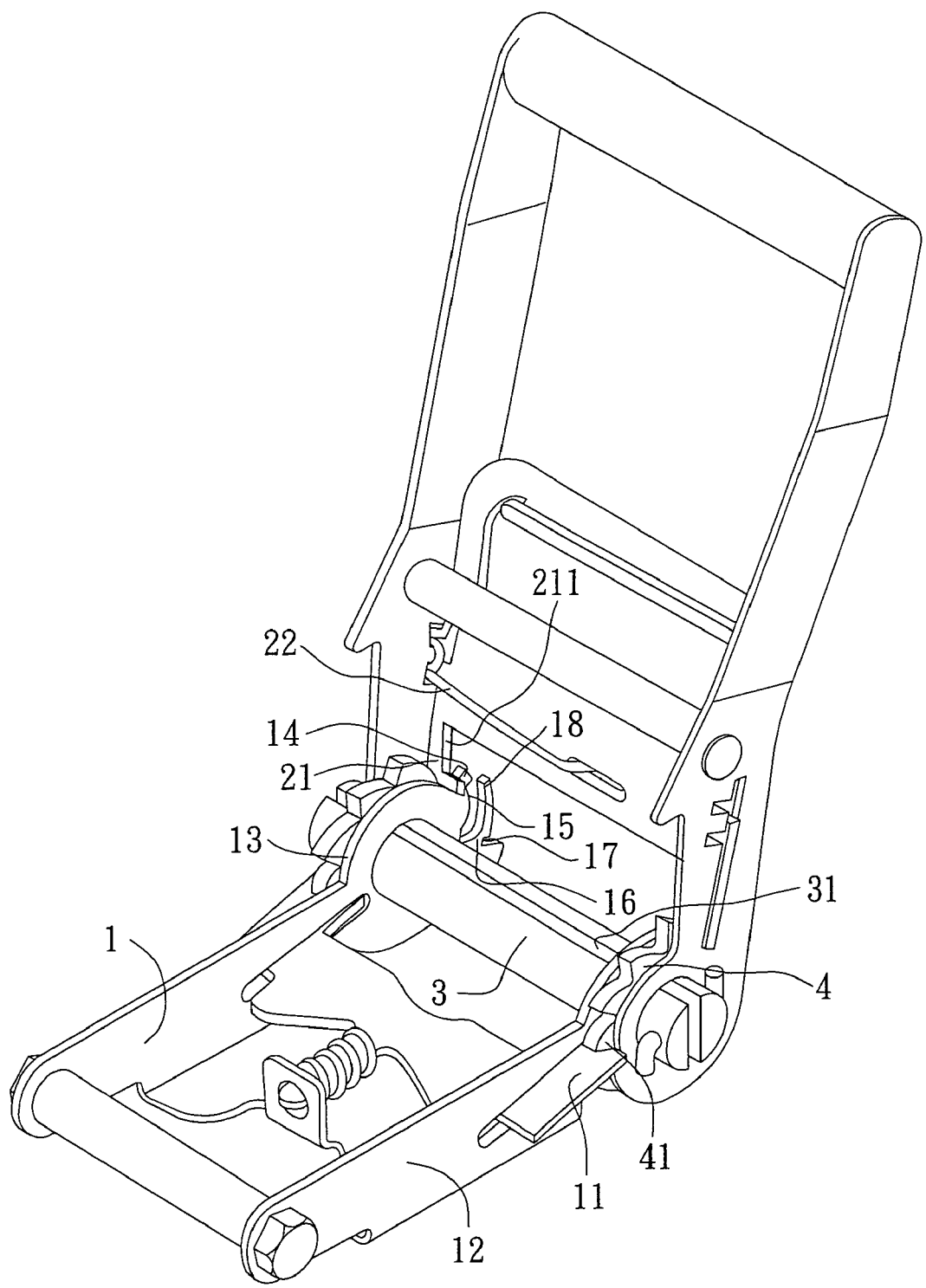
FIG. 1 is a perspective view of a belt reel for fastening goods on a truck in accordance with the present invention.
Figure 2:
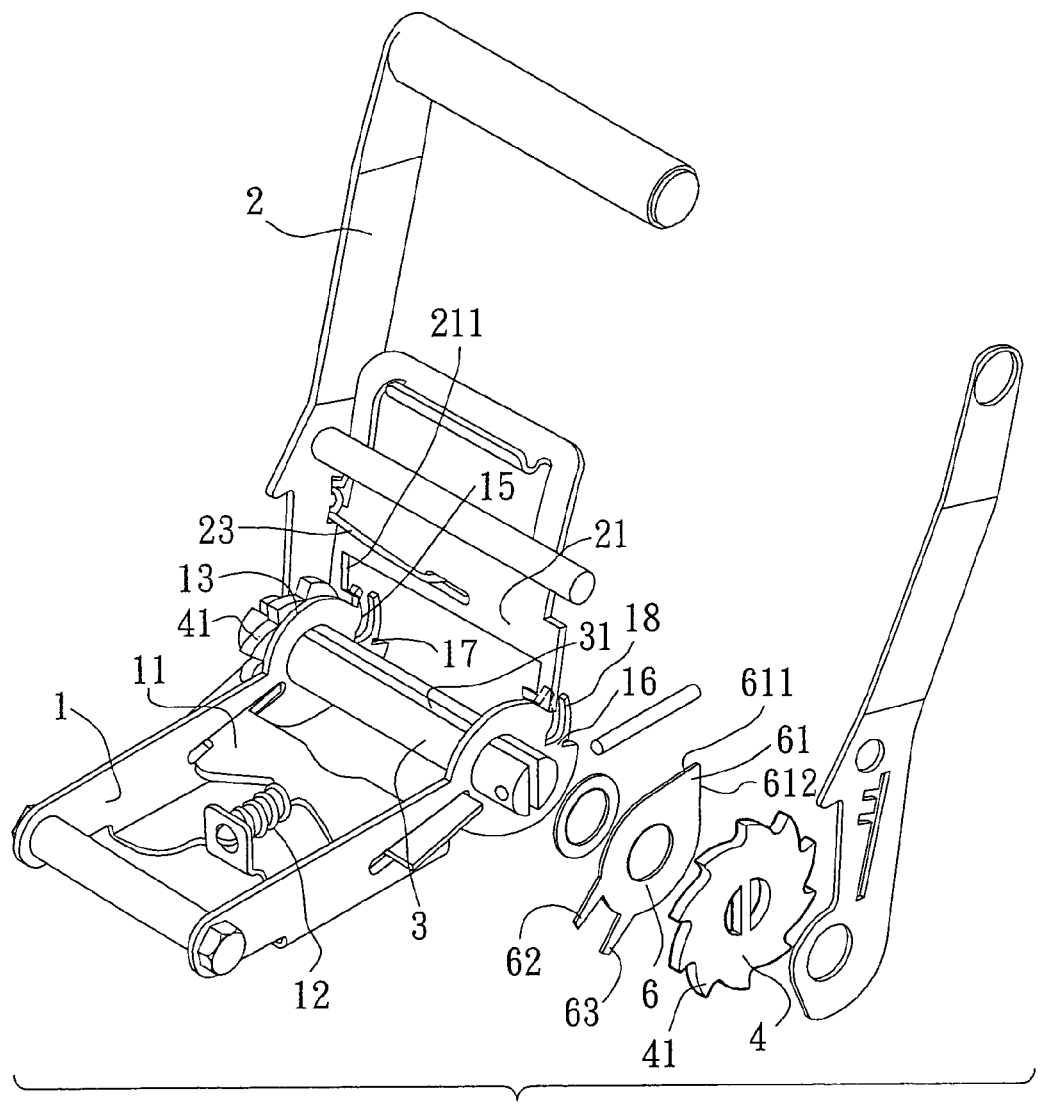
FIG. 2 is a partially exploded perspective view of the belt reel in FIG. 1.
Figure 3:
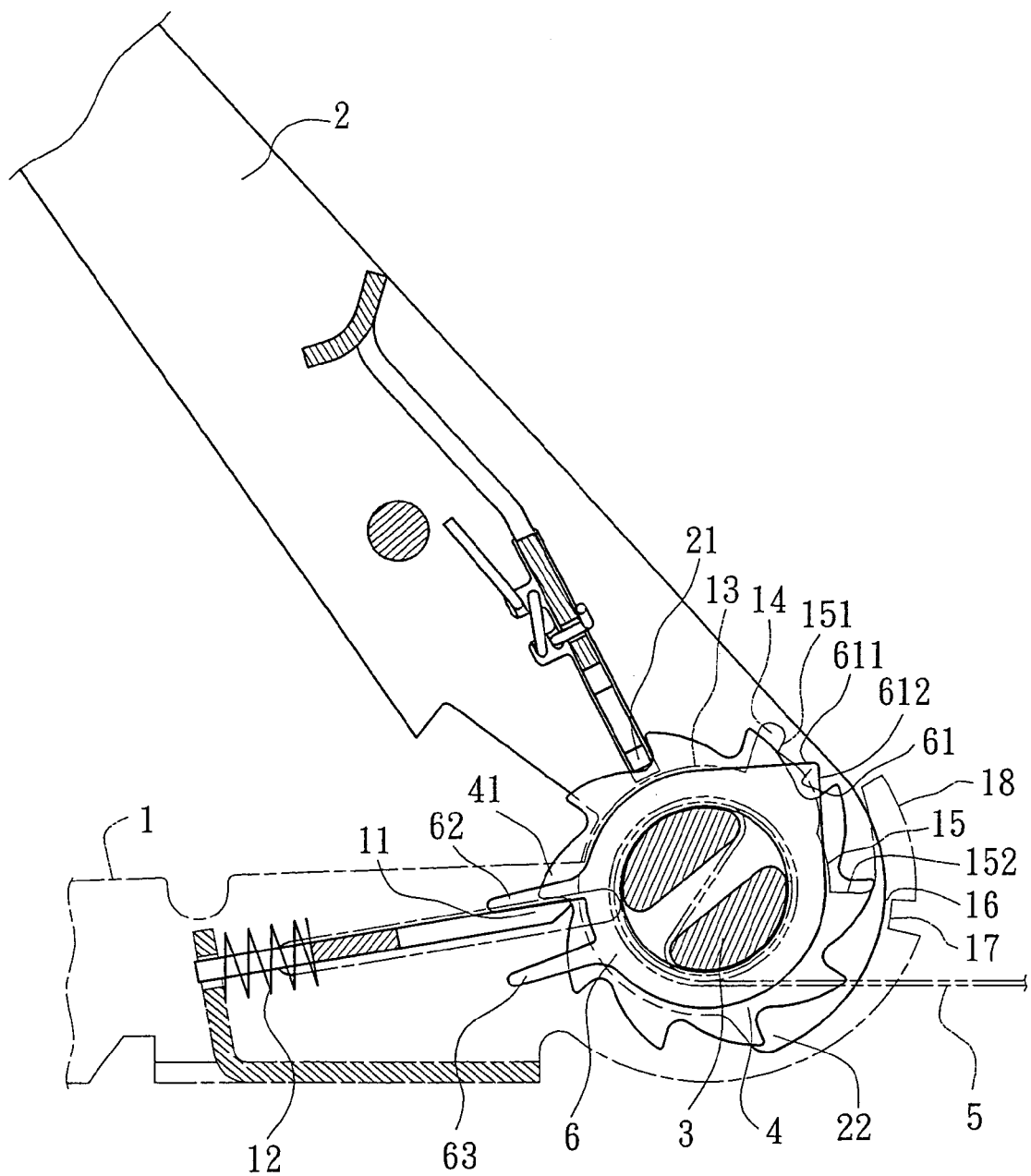
FIG. 3 is a cross-sectional view of the belt reel in FIG. 1.

Referring to the drawings and initially to FIGS. 1–9, a belt reel for fastening goods on a truck in accordance with the present invention comprises an axle (3) extending through a main frame (1) and a lever (2) to pivotally mount the main frame (1) and the lever (2) to each other. The axle (32) has two opposite ends each having a ratchet wheel (4) mounted thereto between the main frame (1) and the lever (2) and rotated with the axle (3). A slot (31) is diametrically defined in the axle (3) for allowing a belt (5) extending through the axle (3). The ratchet wheel (4) has a series of teeth (41) radially extending from a periphery of each of the ratchet wheels (4).

The main frame (1) includes a stop plate (11) slidably mounted therein and a spring (12) compressively mounted between the main frame (1) and the stop plate (11) so that the stop plate (11) is engaged to the ratchet wheels (4) due to a restitution force of the spring (12).

The lever (2) includes a pawl (21) slidably mounted in the lever and corresponding to the two ratchet wheels (4). A resilient member (23) is compressively mounted between the lever (2) and the pawl (21) so that the pawl (21) is selectively engaged to the two ratchet wheels (4) due to the restitution force of the resilient member (23). The pivot portion of the lever (2) includes two opposite sides each having a convex portion (22) extending therefrom and corresponding to the two opposite sides of the stop plate (11). The pivot end of the main frame (1) includes two opposite sides each sequentially having a concave portion (13) defined in the main frame (1), a stopper (14) extending from the main frame (1), a groove (15) defined in the main frame (1), an indentation (17) defined in the main frame (1) and a connecting portion (16) formed between the groove (15) and the indentation (17).

The groove (15) has a first side (151) formed adjacent to the stopper (14) and a second side (152) formed adjacent to the connecting portion (16). The convex portion (22) backward pushes the stop plate (11) to make the stop plate (11) be disengaged from the ratchet wheels (4) when the pawl (21) abuts the second side (152) of the groove (15). The convex portion (22) backward pushes the stop plate (11) to make the stop plate (11) be disengaged from the ratchet wheels (4) and the pawl (21) is disengaged from the ratchet wheels (4) when the pawl (21) is partially received in the indentation (17).

Two plates (6) are respectively pivotally mounted to two opposite ends of the axle (3) between the main frame (1) and the lever (2). Each plate (6) has a cam portion (61) extending therefrom to the groove (15). The cam portion (61) is tapered and has a first guide side (611) and a second guide side (612). The cam portion (61) makes the pawl (21) be moved over the one teeth (41) of the ratchet wheel (4) when moving along the second guide side (612). Each plate (6) includes a first stopper (62) and a second stopper (63) respectively extending therefrom opposite to the cam portion (61) and the stop plate (11) is located between the first stopper (62) and the second stopper (63) to prevent the plate (6) from being overly rotated. The pawl (21) pulls the plate (6) to make the second stopper (63) abut the stop plate (11) and is moved over one of the teeth (41) of the ratchet wheel (4) along the first guide side (611) when the pawl (21) is moved within the groove (15) toward the second side (152) of the groove (15). The pawl (21) is firstly clamped between the tooth (41) and the cam portion (61) and secondarily moved over the cam portion (61) along the second guide side (612) when the pawl (21) is moved within the groove (15) toward the first side (151) of the groove (15) due to the reverse ratchet (4).

A protrusion (18) extends from each of the connecting portion (16) toward the stopper (14). In the preferred embodiment of the present invention, the protrusion (18) is curved. The pawl (21) has a cutout (211) defined therein for allowing the protrusion (18) extending through the pawl (21) when the pawl (21) is moved toward the second side (152) of the groove (15). The pawl (21) abuts the protrusion (18) that guides the pawl (21) to the indentation (17).

Figure 4:
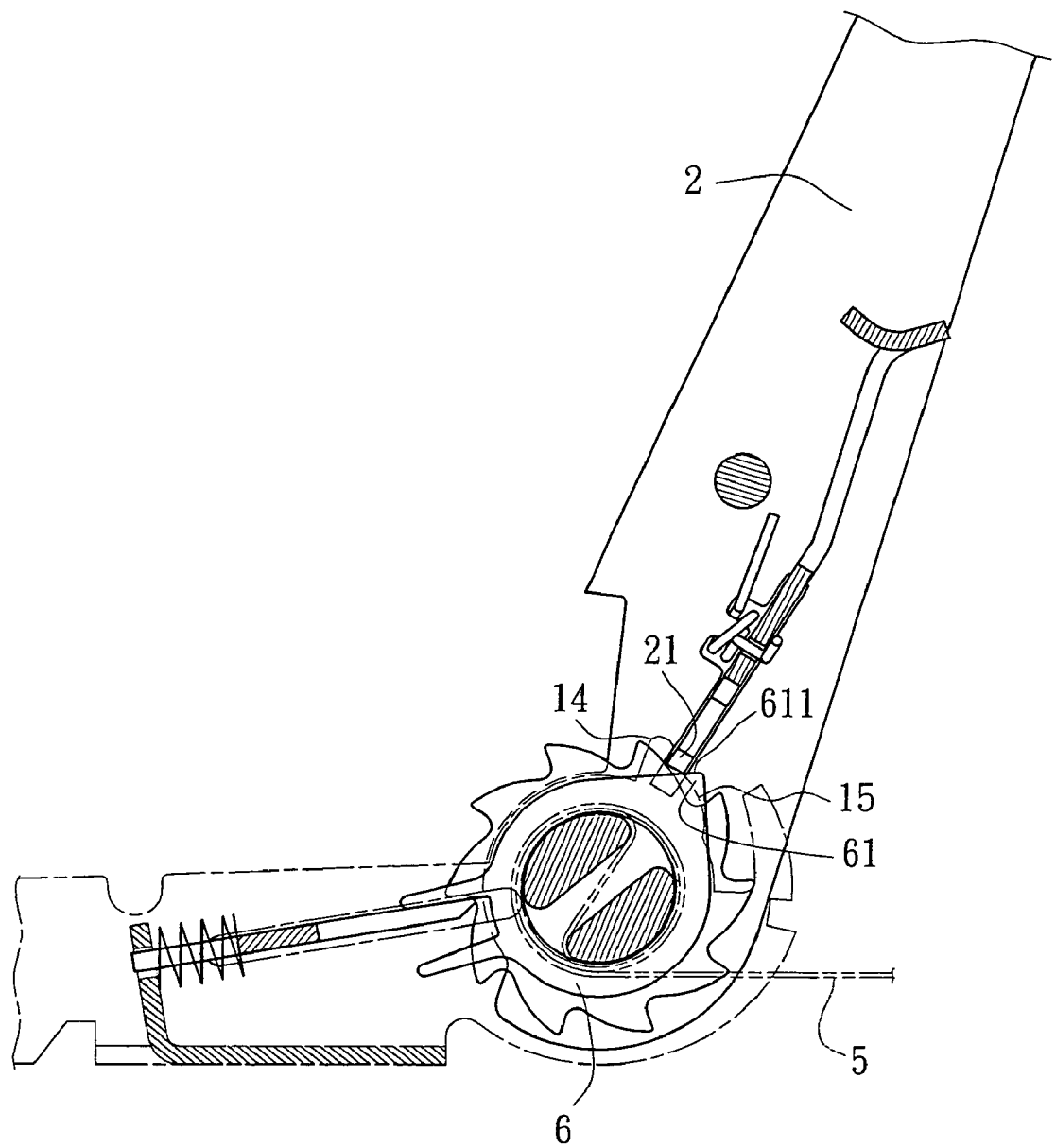
FIG. 4 is an operational side plan view of the belt reel of present invention when releasing belt.
Figure 5:
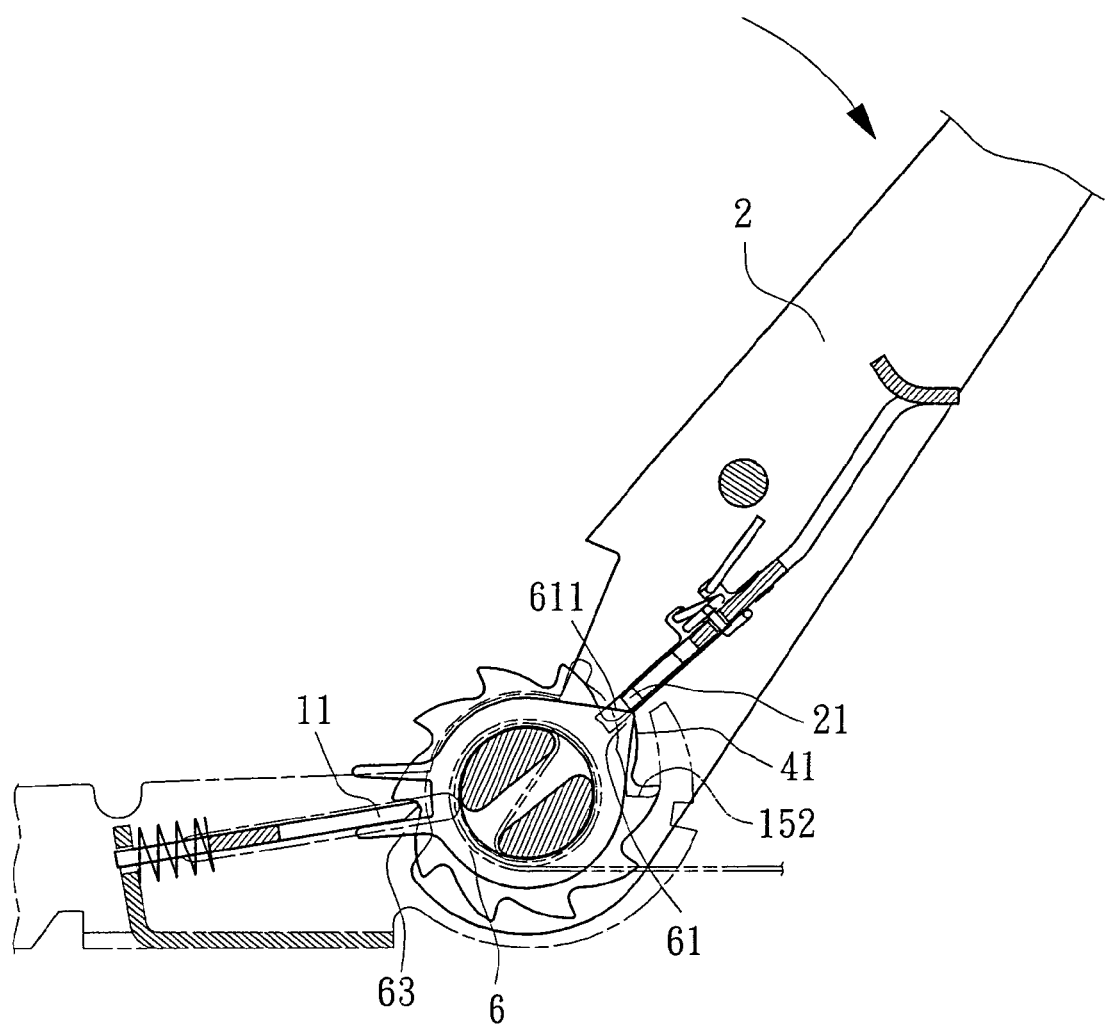
FIG. 5 is an operational side plan view of the belt reel of present invention when releasing belt.
Figure 6:
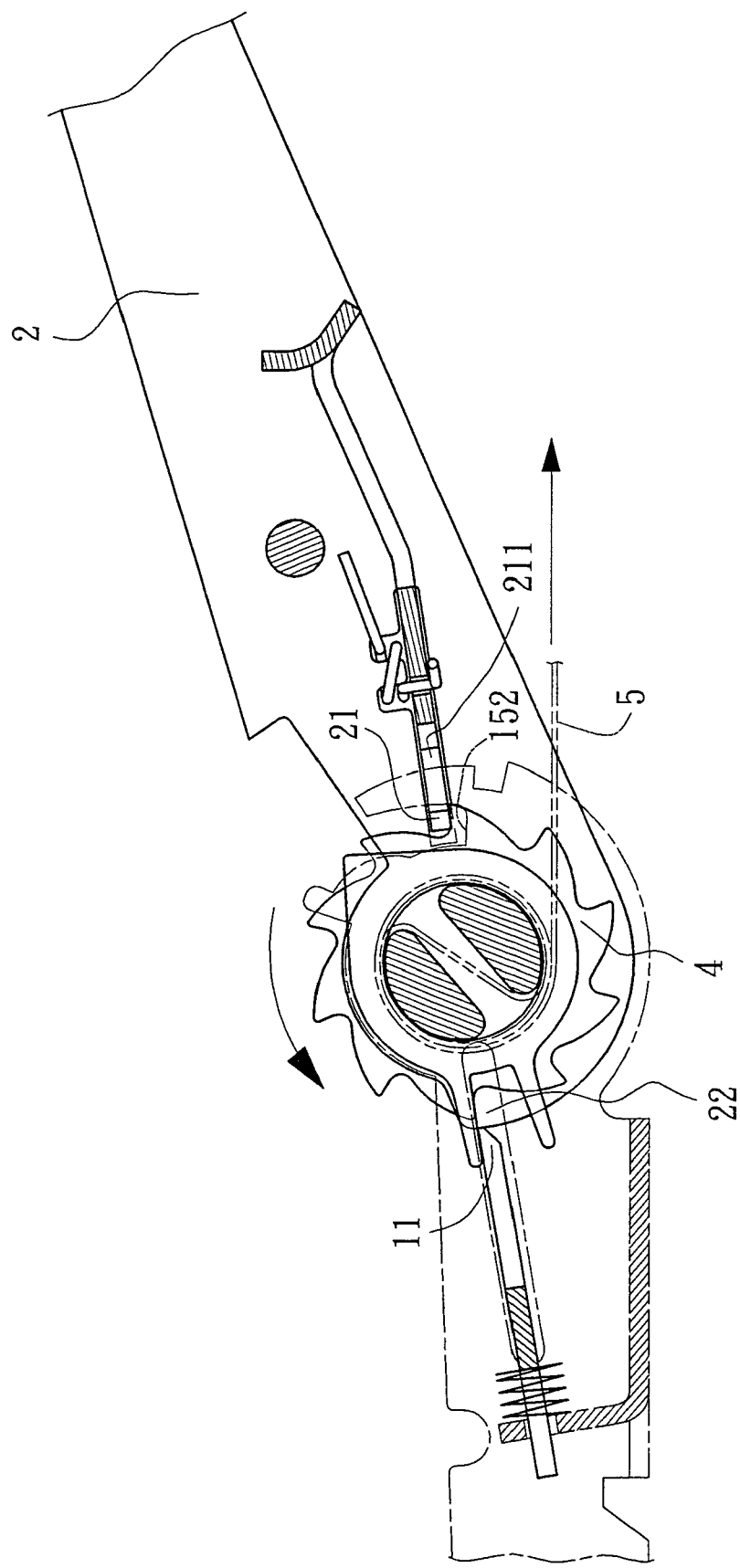
FIG. 6 is an operational side plan view of the belt reel of present invention when releasing belt.
Figure 7:
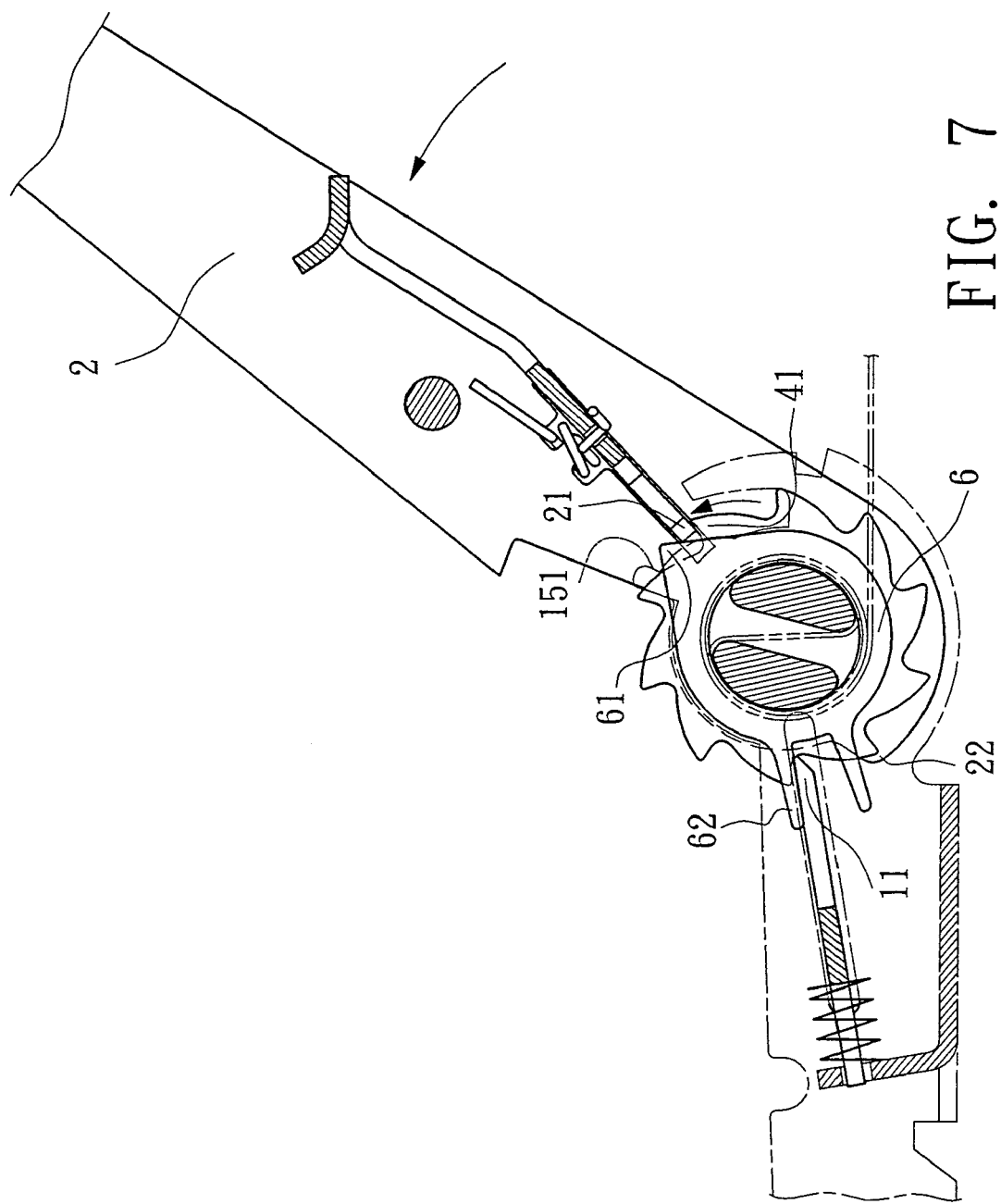
FIG. 7 is an operational side plan view of the belt reel of present invention when releasing belt.

When releasing the strained belt (5), the pawl (21) is backward pulled and the lever (2) is pivotally moved relative to the main frame (1). The pawl (21) is released to abut the first guide side (611) of the plate (6) when the pawl (21) is moved over the stopper (14), as shown in FIG. 4. With reference to FIG. 5, to continually move the lever (2), the pawl (21) pushes the plate (6) to make the second stopper (63) abut the stop plate (11), then the pawl (21) is moved over the tooth (41) along the first guide side (611) of the plate (6). The protrusion (18) extends through the cutout (211) when the pawl (21) moved within the groove (15). With reference to FIG. 6, the convex (22) of the lever (2) backward pushes the stop plate (11) to make the stop plate (11) be disengaged from the ratchet wheel (4) and the axle (3) with the ratchet wheels (4) are rotated to release the belt (5) due to the strain of the strained belt (5) when the pawl (21) is moved to abut the second side (152) of the groove (15). With reference to FIG. 7, the tooth (41) pushes the pawl (21) with the lever (2) moved toward the first side (151) of the groove (15) to make the convex portion (22) be separated from the stop plate (11) so that the stop plate (11) engaged to the ratchet wheels (4) again when the ratchet wheels (4)

is rotated due to the strain of the strained belt (5). Consequently, the belt reel in accordance with the present invention released the strained belt (5) only in a distance each time and the released distance is equal to the pitch of the teeth (41) of each of the ratchet wheels (4) as shown in FIG. 7. Under the condition, the axle (3) will strain the belt (5) again when pulling the lever (2) because the pawl (21) is engaged to the ratchet wheels (4) when pulling the lever (2). The belt (5) restores the original strain before pulling the lever (2) when the convex portion (22) backward pushes the stop plate (11) again. Consequently, the belt reel of the present invention certainly releases the strain of the strained belt (5) step by step.

For fully releasing the strain of the strained belt (5), the operator needs to pull pawl (21) and make the pawl (21) moved over the cam portion (61) along the second guide side (612) of the plate (6), then the relation between the elements of the present invention is shown in FIG. 4. To repeat the above steps, the strain of the strained belt (5) is certainly released step by step.

Figure 8:
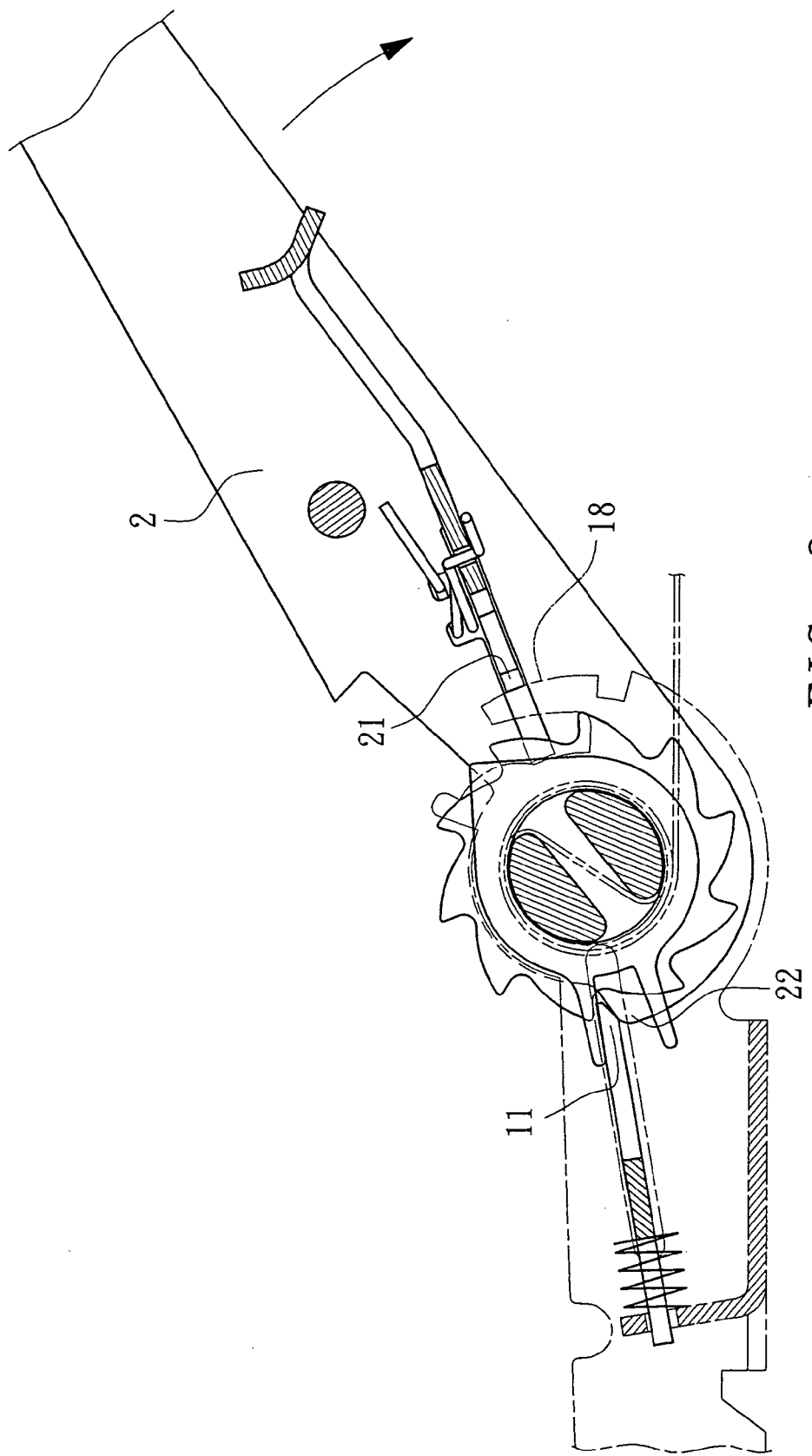
FIG. 8 is an operational side plan view of the belt reel of the present invention when the pawl abutting the protrusion.
Figure 9:
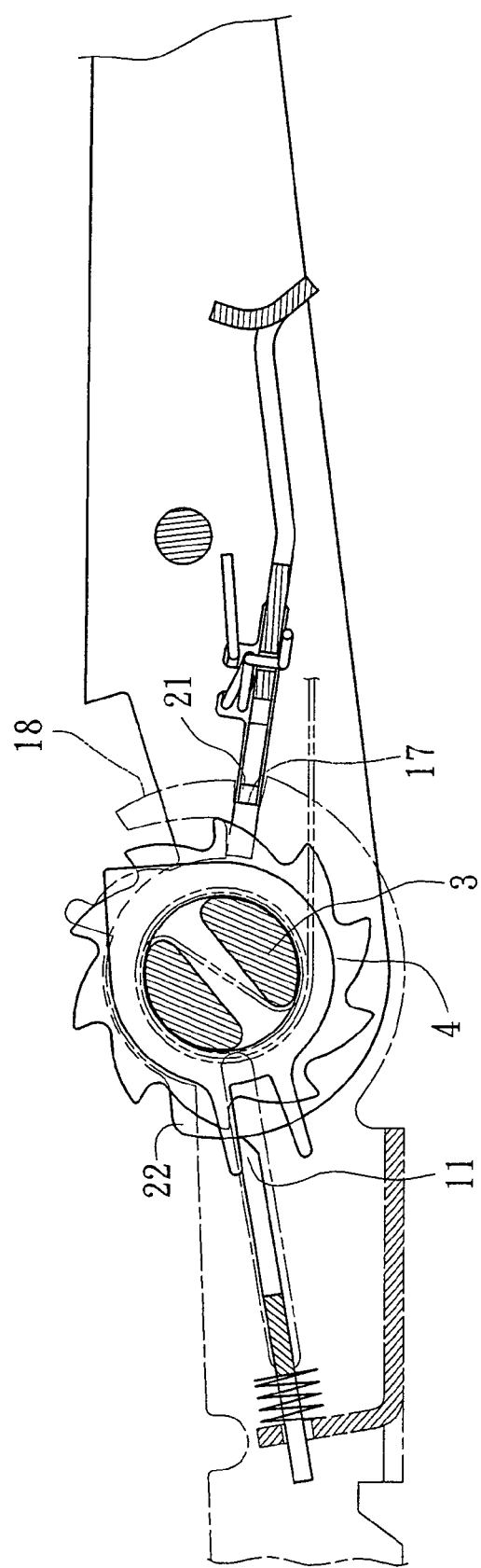
FIG. 9 is an operational side plan view of the belt reel of the present invention when the axle and the ratchets are in free condition.

With reference to FIGS. 8 and 9, the operator can pull the pawl (21) and move the lever (2) to make the pawl (21) abut the protrusion (18) when the strain of the strained belt (5) is fully released. The pawl (21) is moved along the protrusion (18) and the protrusion (18) guides the pawl (21) moved into the indentation (17) when continually moving the lever (2). The operator can easily draw the belt (5) out of the belt reel when the pawl (21) is partially received in the indentation (17) and the stop plate (11) is separated from the ratchet wheels (4) due to the convex portion (22) of the lever (2) because the axle (3) and the ratchet wheels (4) are in a free condition.

Figure 10:
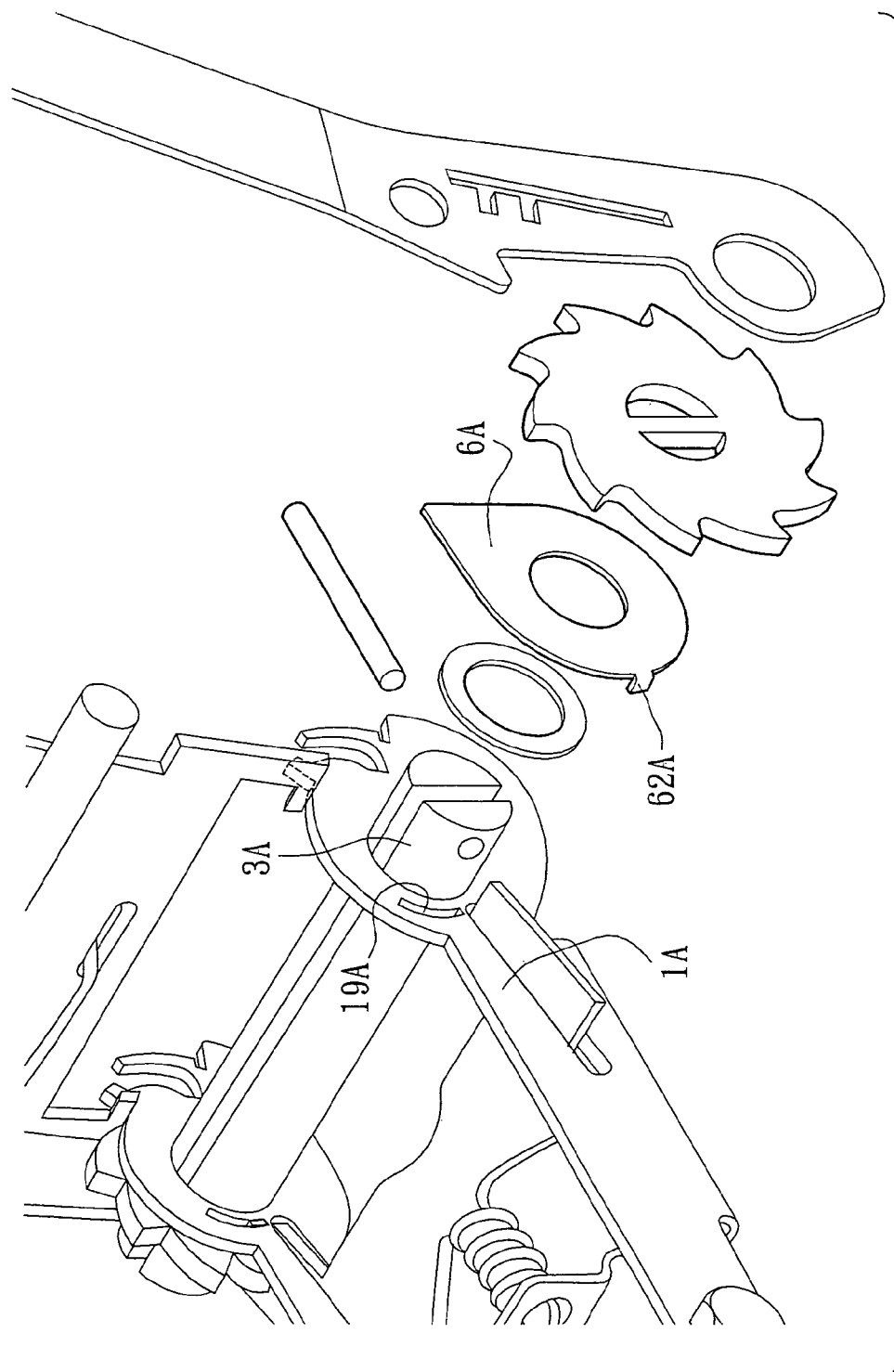
FIG. 10 is partially exploded perspective view of a second embodiment of the belt reel for fastening goods on a truck in accordance with the present invention.

With reference to FIG. 10 that shows a second embodiment of the belt reel in accordance with the present invention, the main frame (1A) includes two arc slots (19A) respectively defined in two opposite sides of the main frame (1A) near the axle (3A). The curvature of each of the arc slots (19A) concentrically corresponds to the axle (3A). Each plate (6A) has a stub (62A) laterally extending therefrom and slidably received in a corresponding one of the two arc slots (19A) in the main frame (1A) to prevent the plate (6A) from being overly rotated.

Figure 11:
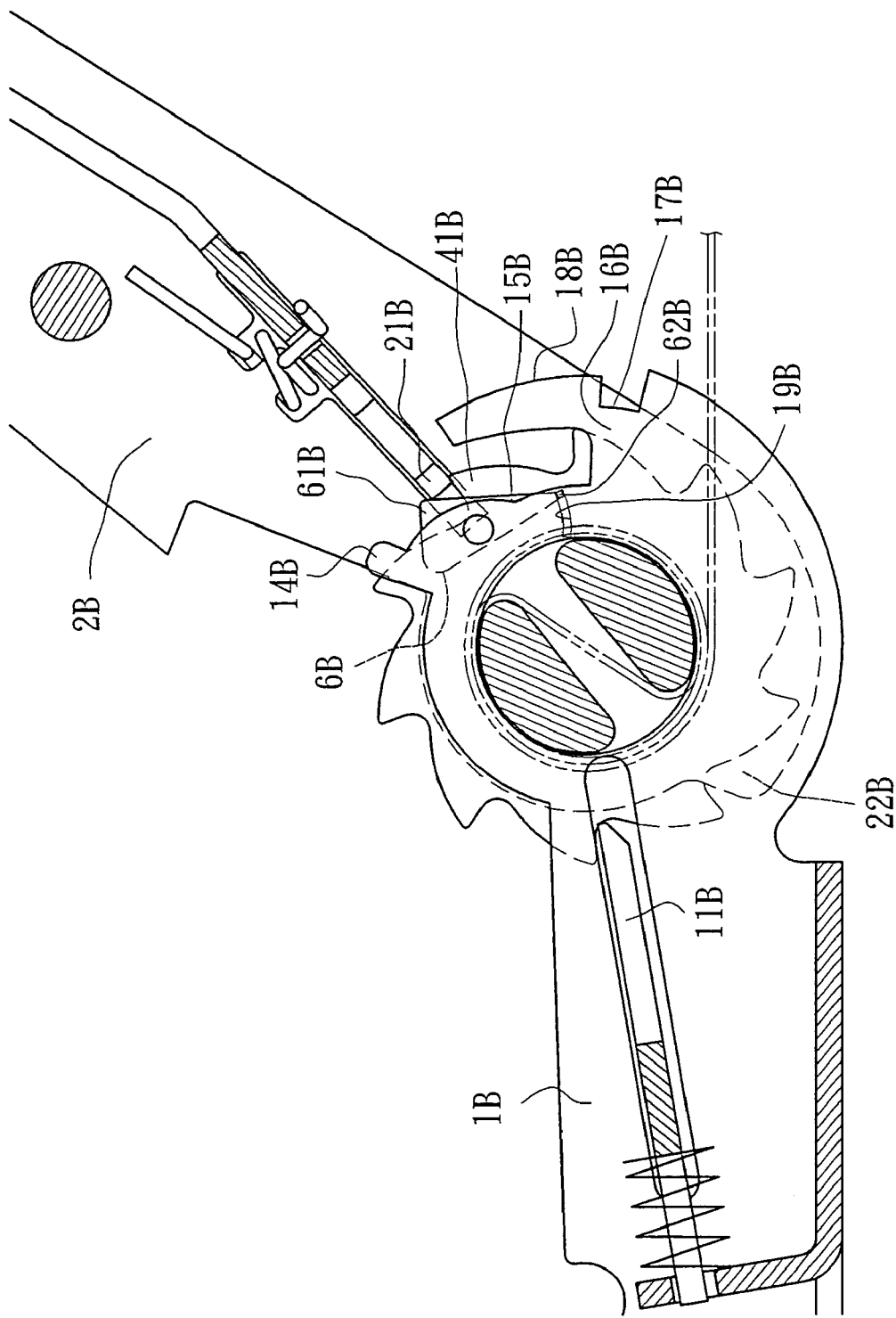
FIG. 11 is a cross-sectional view of a third embodiment of the belt reel for fastening goods on a truck in accordance with the present invention.

With reference to FIG. 11 that shows a third embodiment of the belt reel in accordance with the present invention, the two plates (6B) are respectively pivotally mounted to the main frame (1B) near the groove (15B). The main frame (1B) includes two arc slots (19B) respectively defined in two opposite sides of the main frame (1A) corresponding to a lower end of each of the two plates (6B). Each plate (6B) has a stub (62B) laterally extending therefrom and slidably received in a corresponding one of the two arc slots (19B) in the main frame (1B) to prevent the plate (6B) from being overly rotated.

Figure 12:
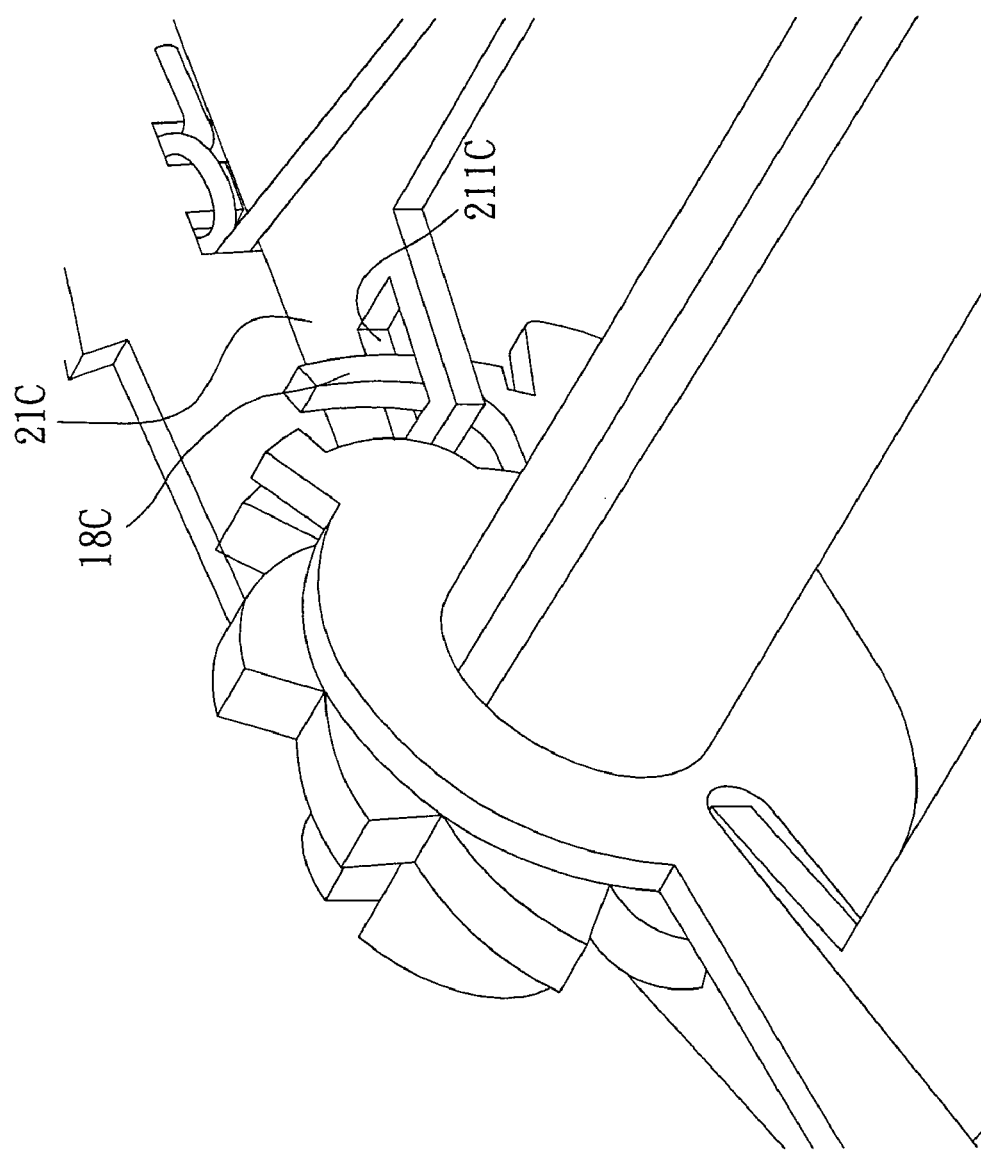
FIG. 12 is a partially perspective view of a fourth embodiment of the belt reel for fastening goods on a truck in accordance with the present invention.
Figure 13:
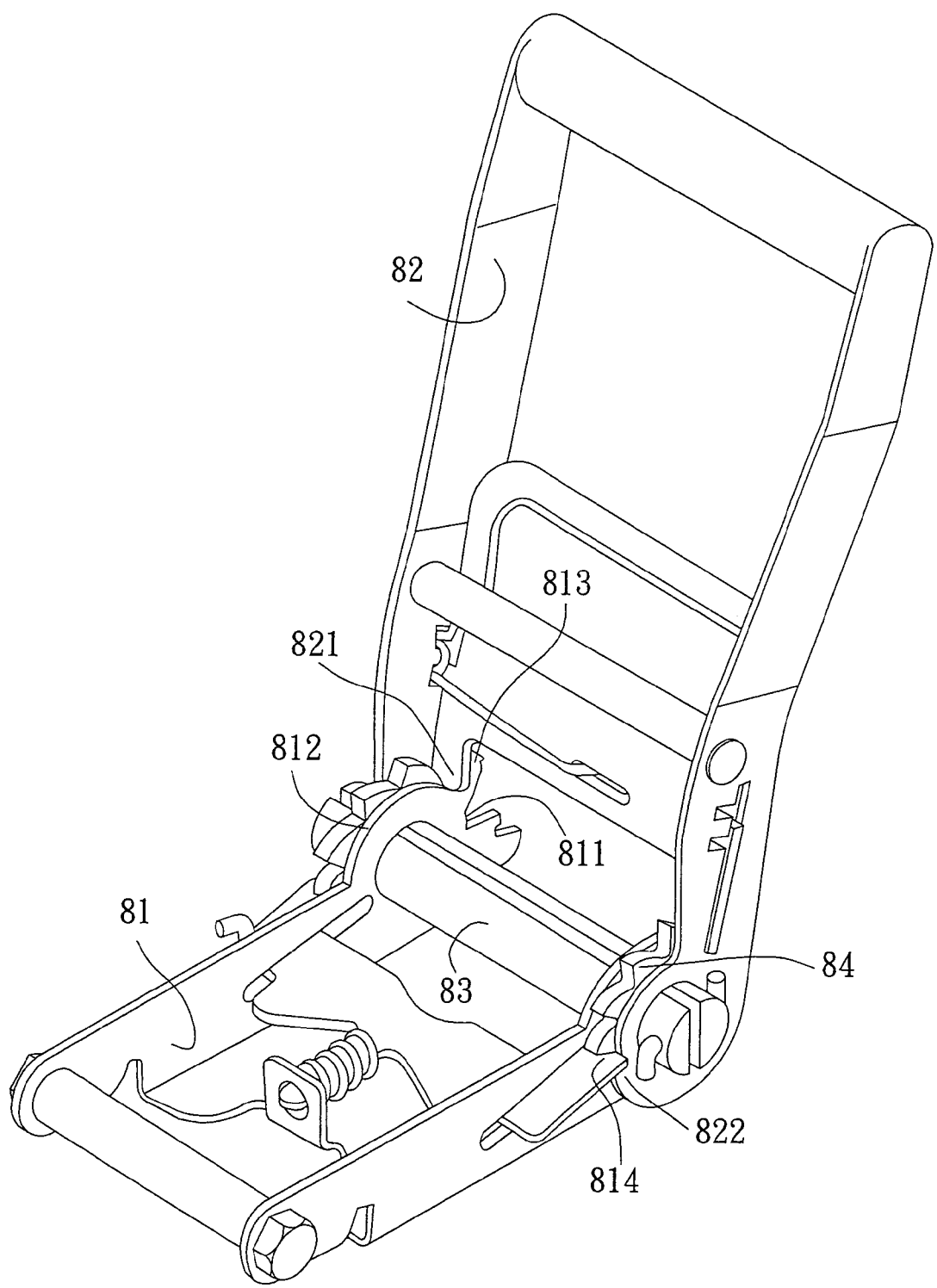
FIG. 13 is a perspective view of a conventional belt reel for fastening goods on a truck in accordance with the prior art.
Figure 14:
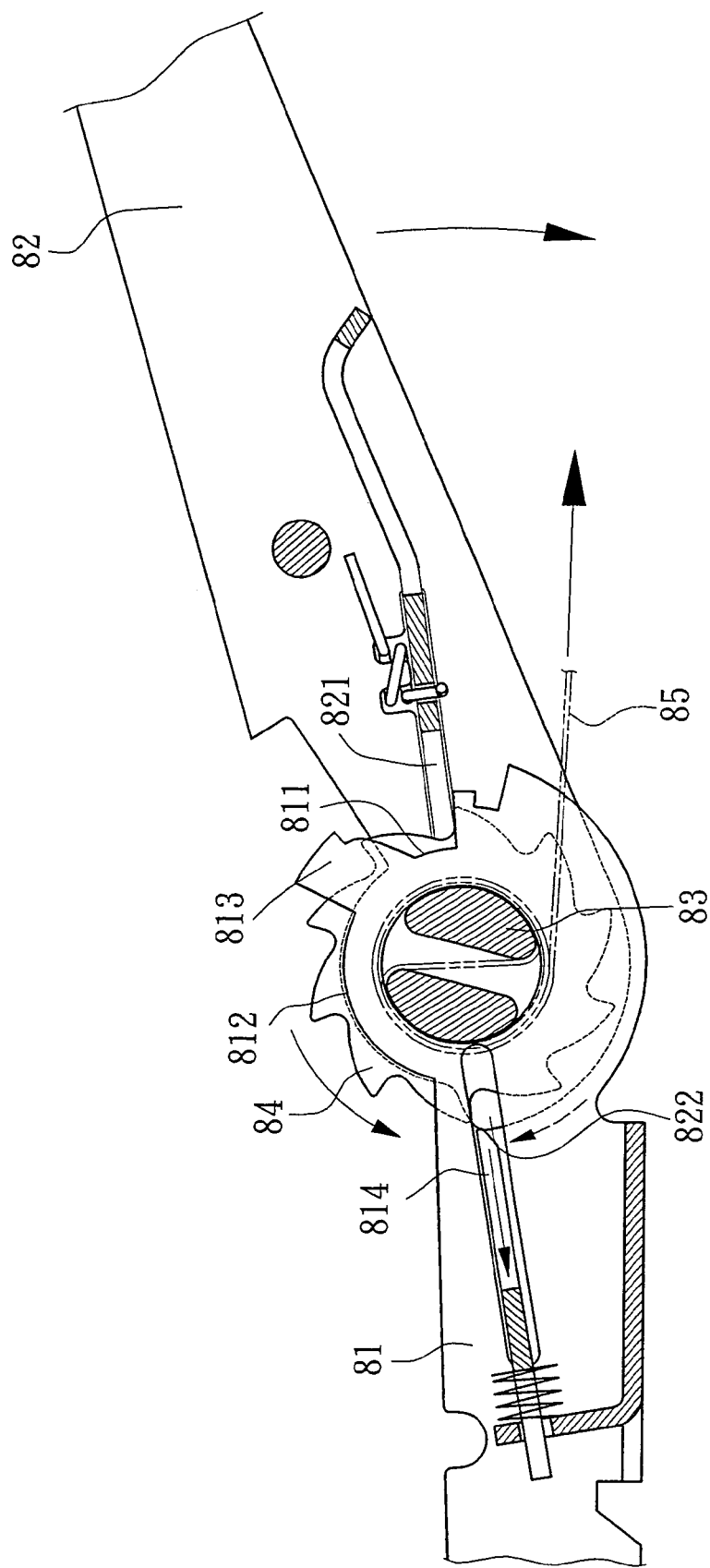
FIG. 14 is a first operational plan view of the belt reel in FIG. 13 when releasing the belt.
Figure 15:
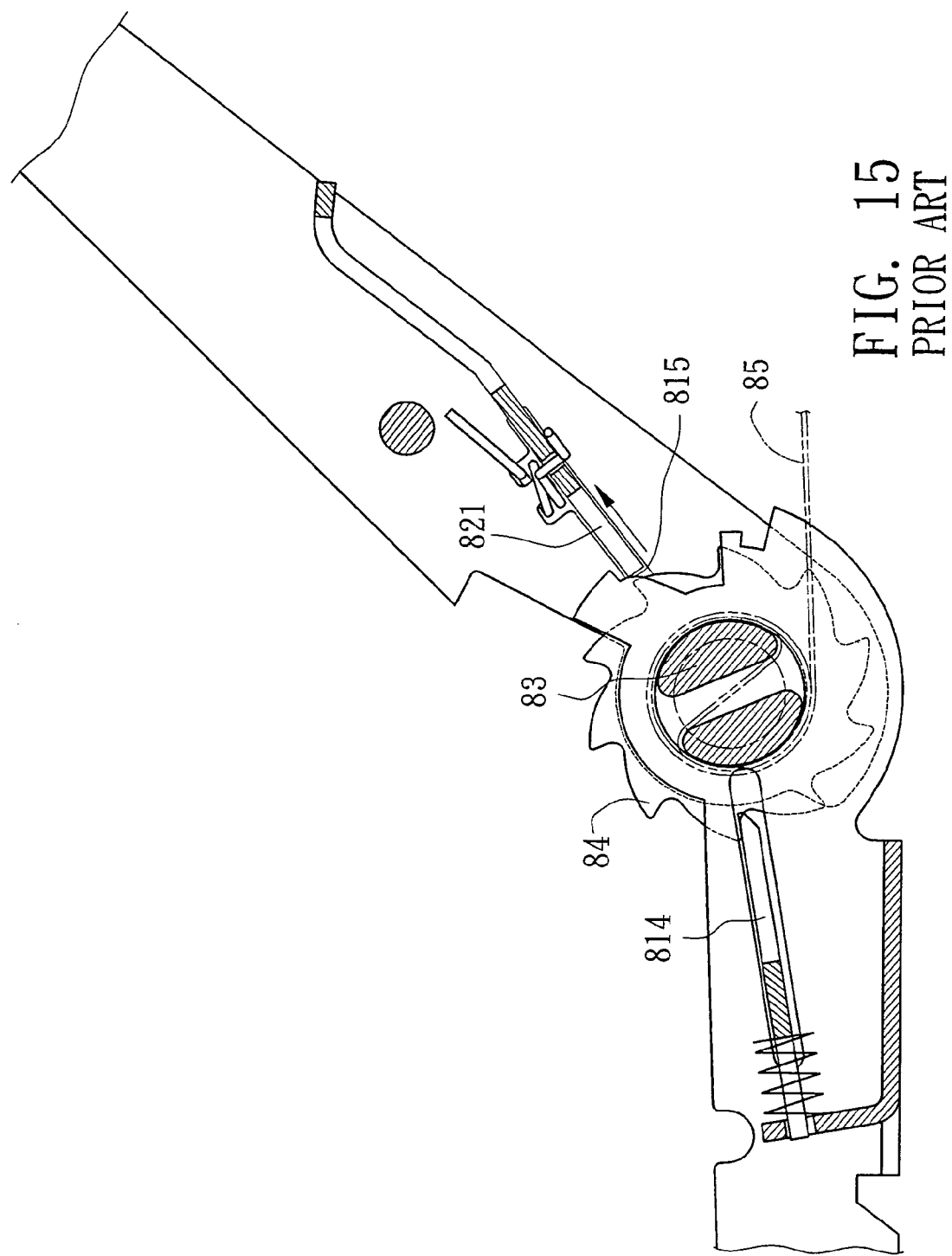
FIG. 15 is a second operational plan view of the belt reel in FIG. 13 when releasing the belt.
Figure 16:
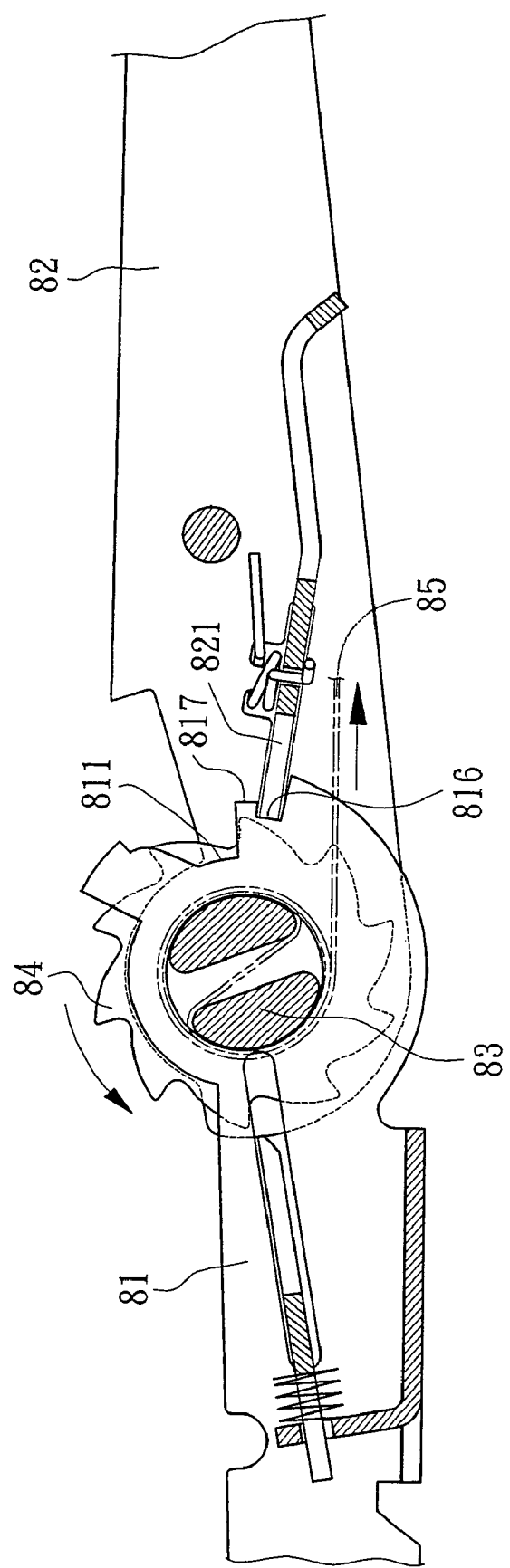
FIG. 16 is an operational plan view of the belt reel in FIG. 13 when the axle and ratchets are in a free condition.

With reference to FIG. 12 that shows a fourth embodiment of the belt reel in accordance with the present invention, the pawl (21C) includes an opening (211C) defined therein and corresponding to the protrusion (18C) such that the protrusion (18C) extends through the pawl (21C) when the lever is pulled.

Although the invention has been explained in relation to its preferred embodiment, it is to be understood that many other possible modifications and variations can be made without departing from the spirit and scope of the invention as hereinafter claimed.

What is claimed is:

1. A belt reel for fastening goods on a truck, comprising an axle extending through a main frame and a lever to pivotally mount the main frame and the lever to each other, the axle having two opposite ends each having a ratchet wheel mounted thereto between the main frame and the lever and rotated with the axle, each ratchet wheel having a series of teeth radially extending therefrom, a slot diametrically defined in the axle for allowing a belt extending through the axle, the main frame including a stop plate slidably mounted therein and a spring compressively mounted between the main frame and the stop plate so that the stop plate is engaged to the two ratchet wheels due to a restitution force of the spring, the lever including a pawl slidably mounted therein and a resilient member mounted between the lever and the pawl so that the pawl is selective engaged to the two ratchet wheels due to a restitution force of the resilient member, the lever including a pivot portion having two opposite sides each having a convex portion extending from the lever and corresponding to the two opposite sides of the stop plate, the main frame includes a pivot end having two opposite sides each sequentially having a concave portion defined in the main frame, a stopper extending from the main frame, a groove defined in the main frame, an indentation defined in the main frame and a connecting portion formed between the groove and the indentation, the groove including a first side formed adjacent to the stopper and a second side formed adjacent to the connecting portion, the convex portion backward pushing the stop plate to make the stop plate disengaged from the ratchet wheels when the pawl abuts the second side of the groove, the convex portion backward pushing the stop plate to make the stop plate disengaged from the ratchet wheels and the pawl disengaged from the ratchet wheels when the pawl is partially received in the indentation;

wherein the improvement comprises:

two plates respectively pivotally mounted to two opposite sides of the main frame, each plate having a cam portion extending therefrom to the groove, the cam portion being tapered and having a first guide side and a second guide side, the cam portion making the pawl moved over the series of teeth of each of the ratchet wheels, each plate being positioned when the pawl is moved over the cam portion, the pawl moved along the first guide side when the pawl is moved within the groove toward the second side of the groove, the pawl firstly clamped between one tooth of the each of the ratchet wheels and the cam portion and secondarily moved over the cam portion along the second guide side when the pawl is moved within the groove toward the first side of the groove due to a reverse ratchet; and a protrusion extending from each of the connecting portion toward the stopper, the protrusion extending through the pawl when the pawl is moved toward the second side of the groove and abuts the protrusion that guides the pawl to the indentation.

2. The belt reel as claimed in claim 1, wherein each plate comprises a first stopper and a second stopper respectively extending therefrom opposite to the cam portion and the stop place is located between the first stopper and the second stopper to prevent the plate from being overly rotated and selectively hold the plate in place when the pawl is moved over the cam portion.

3. The belt reel as claimed in claim 2, wherein the main frame comprises two arc slot respectively defined in two opposite sides of the main frame near the axle, and each plate comprises a stub laterally extending therefrom and slidably received in a corresponding one of the two arc in the main frame to prevent the plate from being overly rotated and selectively hold the plate in place when the pawl is moved over the cam portion.

4. The belt reel as claimed in claim 3, wherein the pawl comprises a cutout defined therein for allowing the protrusion extending through the pawl.

5. The belt reel as claimed in claim 3, wherein the pawl comprises an opening defined therein for allowing the protrusion extending through the pawl.

6. The belt reel as claimed in claim 2, wherein the two plates are respectively mounted to two opposite ends of the axle and the main frame comprises two arc slot respectively defined in two opposite sides of the main frame near the axle, a curvature of each of the arc slots concentrically corresponding to the axle, each plate including a stub laterally extending therefrom and slidably received in a corresponding one of the two arc in the main frame to prevent the plate from being overly rotated and selectively hold the plate in place when the pawl is moved over the cam portion.

7. The belt reel as claimed in claim 6, wherein the pawl comprises a cutout defined therein for allowing the protrusion extending through the pawl.

8. The belt reel as claimed in claim 6, wherein the pawl comprises an opening defined therein for allowing the protrusion extending through the pawl.

9. The belt reel as claimed in claim 1, wherein the main frame comprises two arc slot respectively defined in two opposite sides of the main frame near the axle, and each plate comprises a stub laterally extending therefrom and slidably received in a corresponding one of the two arc in the main frame to prevent the plate from being overly rotated and selectively hold the plate in place when the pawl is moved over the cam portion.

10. The belt reel as claimed in claim 1, wherein the two plates are respectively mounted to two opposite ends of the axle and the main frame comprises two arc slot respectively defined in two opposite sides of the main frame near the axle, a curvature of each of the arc slots concentrically corresponding to the axle, each plate including a stub laterally extending therefrom and slidably received in a corresponding one of the two arc in the main frame to prevent the plate from being overly rotated and selectively hold the plate in place when the pawl is moved over the cam portion.

* * * * *